United States Patent [19]

Ikuta

[11] Patent Number: 5,290,627
[45] Date of Patent: Mar. 1, 1994

[54] FRICTION MATERIAL FOR OPERATING IN OIL

[75] Inventor: Yukio Ikuta, Hanyu, Japan

[73] Assignee: Akebono Brake Industry Co., Ltd., Tokyo, Japan

[21] Appl. No.: 851,534

[22] Filed: Mar. 13, 1992

[30] Foreign Application Priority Data

Apr. 18, 1991 [JP] Japan ................. 3-114010

[51] Int. Cl.⁵ .................. B32B 7/00; B32B 25/06; D02G 3/00
[52] U.S. Cl. ................... 428/251; 428/262; 428/293; 428/361; 428/390; 428/496; 523/152
[58] Field of Search ............. 428/251, 293, 361, 390, 428/391, 262, 496; 523/152

[56] References Cited

U.S. PATENT DOCUMENTS

| | | | |
|---|---|---|---|
| 4,045,608 | 8/1977 | Todd | 428/251 |
| 4,262,788 | 4/1981 | Yamamoto et al. | 428/401 |
| 4,767,389 | 8/1988 | Habegger et al. | 474/266 |
| 4,973,338 | 11/1990 | Gaeta et al. | 51/295 |

*Primary Examiner*—George F. Lesmes
*Assistant Examiner*—Blaine Copenheaver
*Attorney, Agent, or Firm*—Oblon, Spivak, McClelland, Maier & Neustadt

[57] ABSTRACT

A friction material for operating in oil containing 5 to 70 wt. % of fibrillated ramie fibers with a freeness of 400 to 700 ml and a friction material for operating in oil further containing cotton pulp and/or aramid fibers in addition to said fibrillated ramie fibers. They improve the wear resistance of friction material under the conditions of high-speed and high-pressure applied and in moisture-containing oil.

1 Claim, No Drawings

FRICTION MATERIAL FOR OPERATING IN OIL

BACKGROUND OF THE INVENTION

The present invention relates to friction materials utilized for wet brake, wet clutch, power shift clutch, power take-off clutch, transmission, etc. for industrial machine vehicles, construction machine vehicles and cars, which are excellent in the wear resistance particularly under the conditions of high-speed and high-pressure applied and in moisture-containing oil.

With conventional paper-like friction materials for operating in oil, the wear is significant under the conditions of high-speed and high-pressure applied and further chipping and peeling-off generate on braking, hence the limit of use conditions has been at low level. Moreover, even if they may be used without problems in a new oil at the beginning of use, a phenomenon of abnormally increased wear occurs when moisture is incorporated into oil due to some external reason, formation of dew, or the like.

As a result of extensive investigations in view of this situation, friction materials for operating in oil having excellent wear resistance under the conditions of high-speed and high-pressure applied and in moisture-containing oil have been developed by the invention.

SUMMARY OF THE INVENTION

One of the inventive paper-like friction materials for operating in oil is characterized by containing 5 to 70 wt. % of fibrillated ramie fibers with a freeness of 400 to 700 ml.

Moreover, other one of the inventive friction materials is characterized by containing 5 to 70 wt. % of fibrillated ramie fibers with a freeness of 400 to 700 ml and further containing cotton pulp and/or aramid fibers such as KEVLAR (E.I. Du-Pont).

DETAILED DESCRIPTION OF THE INVENTION

Since such fibrillated ramie fibers (hemp pulp) with a high value of freeness have characteristics of low contraction on drying and high tensile strength, a smooth product with low dimensional change, thus low strain on producing friction material can be obtained, with which the wear resistance is high and the chipping, peeling-off, etc. are hard to occur.

Moreover, since the tensile strength in water is superior to that of wood pulp or cotton pulp, the generation of abnormal wear when using particularly in moisture-containing oil can be prevented.

The freeness of fibrillated ramie fibers to be used is set on 400 to 700 ml as described above, but fibers adjusted to 500 to 600 ml are more preferable.

And, for the inventive friction materials, following formulating compositions are suitable.

| Formulating composition | |
|---|---|
| Fibrillated ramie fibers | 5–70 wt. % |
| Cotton pulp | 0–65 wt. % |
| Friction dust | 3–10 wt. % |
| Rouge | 1–10 wt. % |
| Graphite | 1–10 wt. % |
| Rubber latex | 1–10 wt. % |
| Diatomaceous earth | 10–30 wt. % |
| Aramid fibers | 0–30 wt. % |

A paper-like sheet is made with such formulating composition. After liquid phenolic resin was impregnated into this sheet at a content of 20 to 30 wt. % and dried, the sheet is die-cut to a fixed ring shape. Then, this is thrown into a hot press mold and thermally molded for 2 minutes at a temperature of 170° C. and under a pressure of 150 kg/cm$^2$ to finish to a fixed thickness and density. Next, after the heat treatment for 2 hours at 160° C., said ring-shaped sheets are adhered onto both sides of steel plate and groove machining is made on inner faces of this steel plate to give a product of friction material. Besides, at this time, simultaneous implementation of simultaneous mold is more advantageous from the aspects of cost, adhesive strength and dimensional accuracy (variation in thickness).

In following, examples of the invention will be illustrated.

EXAMPLE

From the paper-like sheets with formulating proportions as shown in Table 1, the inventive friction materials and a comparative friction material were made according to the method aforementioned.

TABLE 1

| Formulating component (wt. %) | Inventive friction material 1 | Inventive friction material 2 | Comparative friction material 3 |
|---|---|---|---|
| Fibrillated ramie fibers | 60 | 30 | — |
| Cotton pulp | — | 25 | 60 |
| Friction dust | 5 | 5 | 5 |
| Rouge | 5 | 5 | 5 |
| Graphite | 3 | 3 | 3 |
| Rubber latex | 2 | 2 | 2 |
| Diatomaceous earth | 25 | 25 | 25 |
| Kevlar (aramid fibers) | — | 5 | — |
| Resin content | 25 | 25 | 25 |

With two sheets of each said friction material, test of frictional performance was carried out with wet dynamometer (inertia type) using an oil: Transmission oil #80 (J-20A), oil temperature: 80° to 120° C. and mating friction material: AISI 1045 and further under conditions shown in Table 2, The results are put down in Table 2.

TABLE 2

| Item | Inventive friction material 1 | | Inventive friction material 2 | | Comparative friction material 3 | |
|---|---|---|---|---|---|---|
| Test conditions | | | | | | |
| Test size | 173φ × 143φ × 4.7t | | Same as left | | Same as left | |
| Inertial moment (kgms$^2$) | 0.3 | | Same as left | | Same as left | |
| Number of revolutions (rpm) | 1800 | | Same as left | | Same as left | |
| Pressure (kg/cm$^2$) | 30 | | Same as left | | Same as left | |
| Test results | | | | | | |
| Incorporation level of water in oil (%) | 0 | 1 | 0 | 1 | 0 | 1 |
| Wear level after 1000 brakings (mm) | 0.02 | 0.02 | 0.02 | 0.03 | 0.06 | 0.13 |
| Wear level after 10000 brakings (mm) | 0.07 | 0.08 | 0.08 | 0.10 | — | — |
| Chipping and peeling-off | No | No | No | No | Yes | Yes |

According to Table 2, both of the inventive friction materials 1 and 2 show lower wear level and further less increase in wear level even when water is incorporated into oil, compared with comparative friction material 3 not containing fibrillated ramie fibers. In addition, with the inventive friction materials, no chipping and peeling-off generated.

As described, in accordance with the inventive friction materials, conspicuous effects are exerted in that excellent wear resistance can be obtained even under severe conditions of high-speed and high-pressure applied and further even in oil incorporated with water, and others.

What is claimed is:

1. A friction material for operating in oil consisting essentially of the following components: 5-70 wt. % of fibrillated ramie fibers, 0-65 wt. % of cotton pulp, 3-10 wt. % of friction dust, 1-10 wt. % of rouge, 1-10 wt. % of graphite, 1-10 wt. % of rubber latex, 10-30 wt. % of diatomaceous earth, and 0-30 wt. % of aramide fibers.